(12) United States Patent
Inokuchi et al.

(10) Patent No.: US 12,053,999 B2
(45) Date of Patent: Aug. 6, 2024

(54) OPTICAL DISPLAY BODY, PAGE PAIR, PRODUCT, PRINTED PRODUCT, PASSPORT, CARD, BILL, LABEL, TAG, AND TICKET

(71) Applicant: TOPPAN PRINTING CO., LTD., Tokyo (JP)

(72) Inventors: Masami Inokuchi, Tokyo (JP); Makoto Maehira, Tokyo (JP)

(73) Assignee: TOPPAN PRINTING CO., LTD., Tokyo (JP)

( * ) Notice: Subject to any disclaimer, the term of this patent is extended or adjusted under 35 U.S.C. 154(b) by 641 days.

(21) Appl. No.: 17/236,434

(22) Filed: Apr. 21, 2021

(65) Prior Publication Data

US 2021/0237500 A1    Aug. 5, 2021

Related U.S. Application Data

(63) Continuation of application No. PCT/JP2019/041390, filed on Oct. 21, 2019.

(30) Foreign Application Priority Data

Oct. 22, 2018  (JP) ................... 2018-198538

(51) Int. Cl.
*B42D 25/342* (2014.01)
*B41M 3/14* (2006.01)
(Continued)

(52) U.S. Cl.
CPC ........... *B42D 25/342* (2014.10); *B41M 3/148* (2013.01); *B42D 25/24* (2014.10); *B42D 25/328* (2014.10)

(58) Field of Classification Search
CPC .... B42D 25/342; B42D 25/24; B42D 25/328; B42D 25/45; B41M 3/148; B41M 3/14; G07D 7/12; G07D 7/207; G02B 5/18
(Continued)

(56) References Cited

U.S. PATENT DOCUMENTS

2007/0035833 A1* 2/2007 Moia ................... G02B 5/3083
                                                              359/485.01
2016/0325578 A1  11/2016 Ritter et al.

FOREIGN PATENT DOCUMENTS

EP         1129373         5/2000
JP         49-131142       12/1974
(Continued)

OTHER PUBLICATIONS

International Search Report (Forms PCT/ISA/210) mailed Dec. 3, 2019 in corresponding International Patent Application No. PCT/JP2019/041390 (3 pages) (2 pages English Translation).
(Continued)

*Primary Examiner* — Justin V Lewis
(74) *Attorney, Agent, or Firm* — STAAS & HALSEY LLP

(57) ABSTRACT

An optical display body (1) is provided with: a stripe mask (10) that includes a transmission part (T) and a reflection part (R) that is wider than the transmission part, a transmission part and a reflection part which are alternately arranged so as to form a stripe pattern; and a printed body (20) that includes a flattened design (21A) which is a visible image (21B) flattened in a Y direction and which is printed two or more times repeatedly in an X direction. The stripe mask, upon being superimposed on the printed body such that a stripe direction of the stripe mask will be coincident with the X direction of the printed body, allows a visible image to be displayed through the stripe mask.

16 Claims, 14 Drawing Sheets

(51) Int. Cl.
*B42D 25/24* (2014.01)
*B42D 25/328* (2014.01)

(58) Field of Classification Search
USPC ............. 283/72, 74, 77, 81, 91, 94, 98, 901;
359/483, 485
See application file for complete search history.

(56) References Cited

FOREIGN PATENT DOCUMENTS

| | | |
|---|---|---|
| JP | 57-20395 A | 2/1982 |
| JP | 60-79991 A | 5/1985 |
| JP | 2002-226740 A | 8/2002 |
| JP | 2002-530687 A | 9/2002 |
| JP | 2006-123174 A | 5/2006 |
| JP | 2013-504451 A | 2/2013 |
| WO | WO 2018/164237 A1 | 9/2018 |

OTHER PUBLICATIONS

Written Opinion of the International Searching Authority (Form PCT/ISA/237) mailed Dec. 3, 2019 in corresponding International Patent Application No. PCT/JP2019/041390 (3 pages).
Written Opinion of the International Searching Authority (Form PCT/ISA/237) mailed Dec. 3, 2019 in corresponding International Patent Application No. PCT/JP2019/041390 (3 pages) (4 pages English Translation).
International Preliminary Report on Patentability (Form PCT/IB/373); issued Apr. 27, 2021 in corresponding International Patent Application No. PCT/JP2019/041390 (1 page).
Notification of Transmittal of Copies of Translation of the International Preliminary Report on Patentability (Form PCT/IB/338); issued May 6, 2021 in corresponding International Patent Application No. PCT/JP2019/041390 (1 page).
Extended European Search Report dated Oct. 6, 2022 in related European Patent Application No. 19877502.5 (7 pages).

* cited by examiner

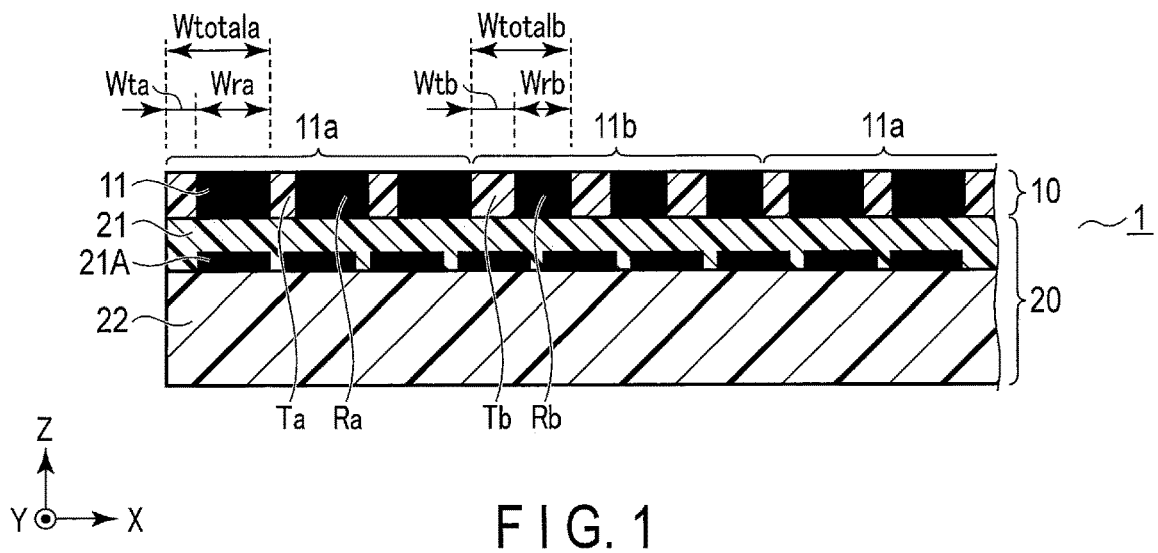
F I G. 1
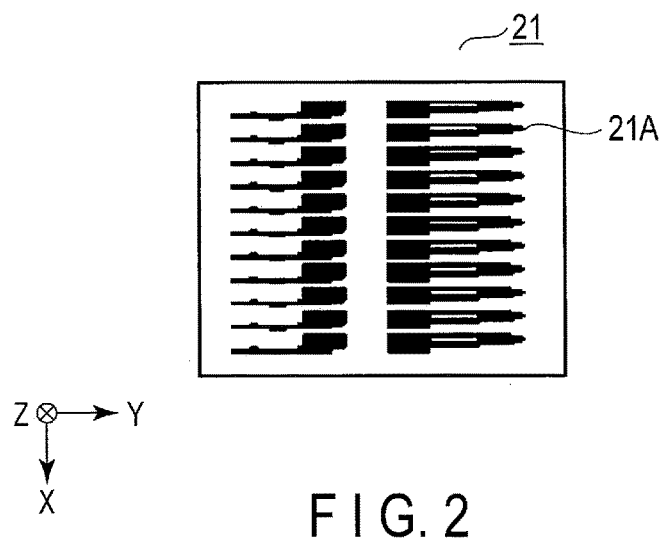
F I G. 2
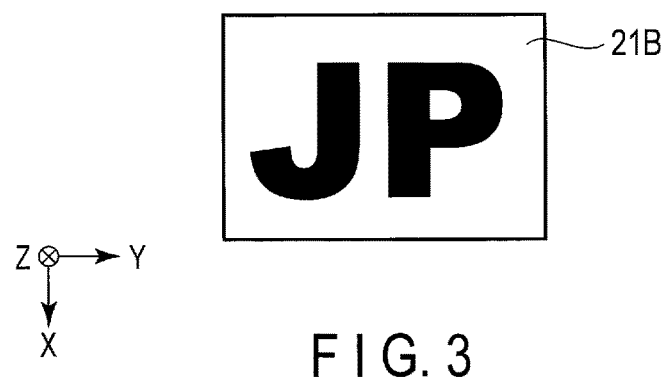
F I G. 3

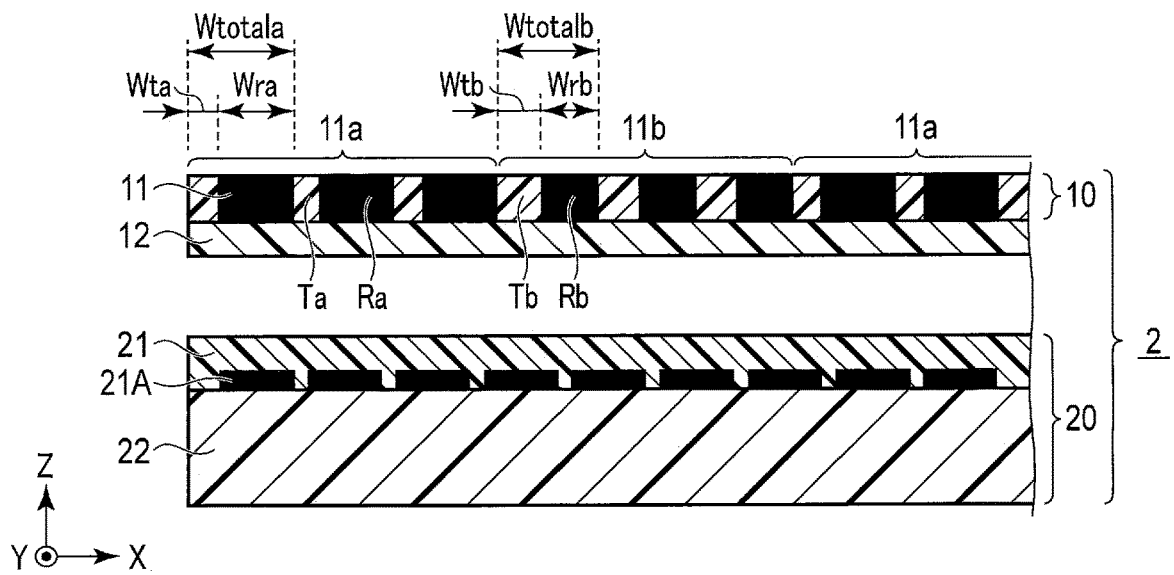
F I G. 4
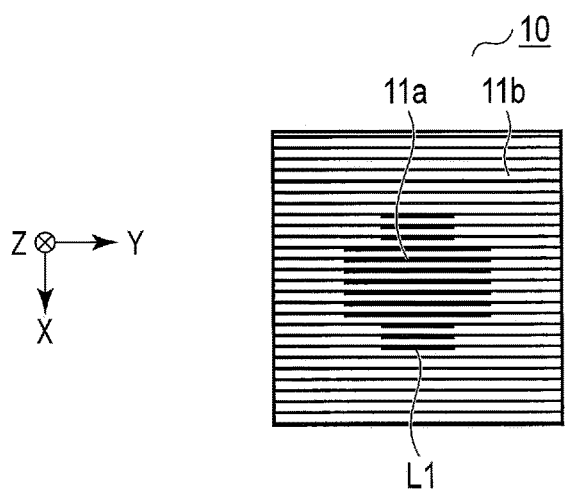
F I G. 5
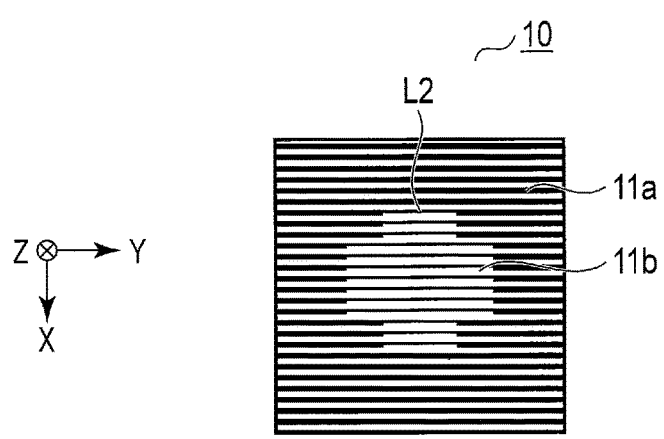
F I G. 6

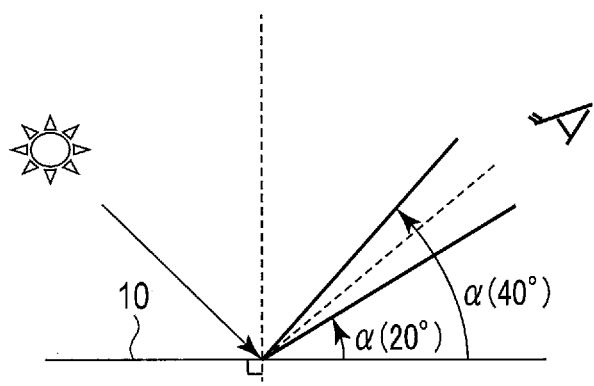
F I G. 7
F I G. 8

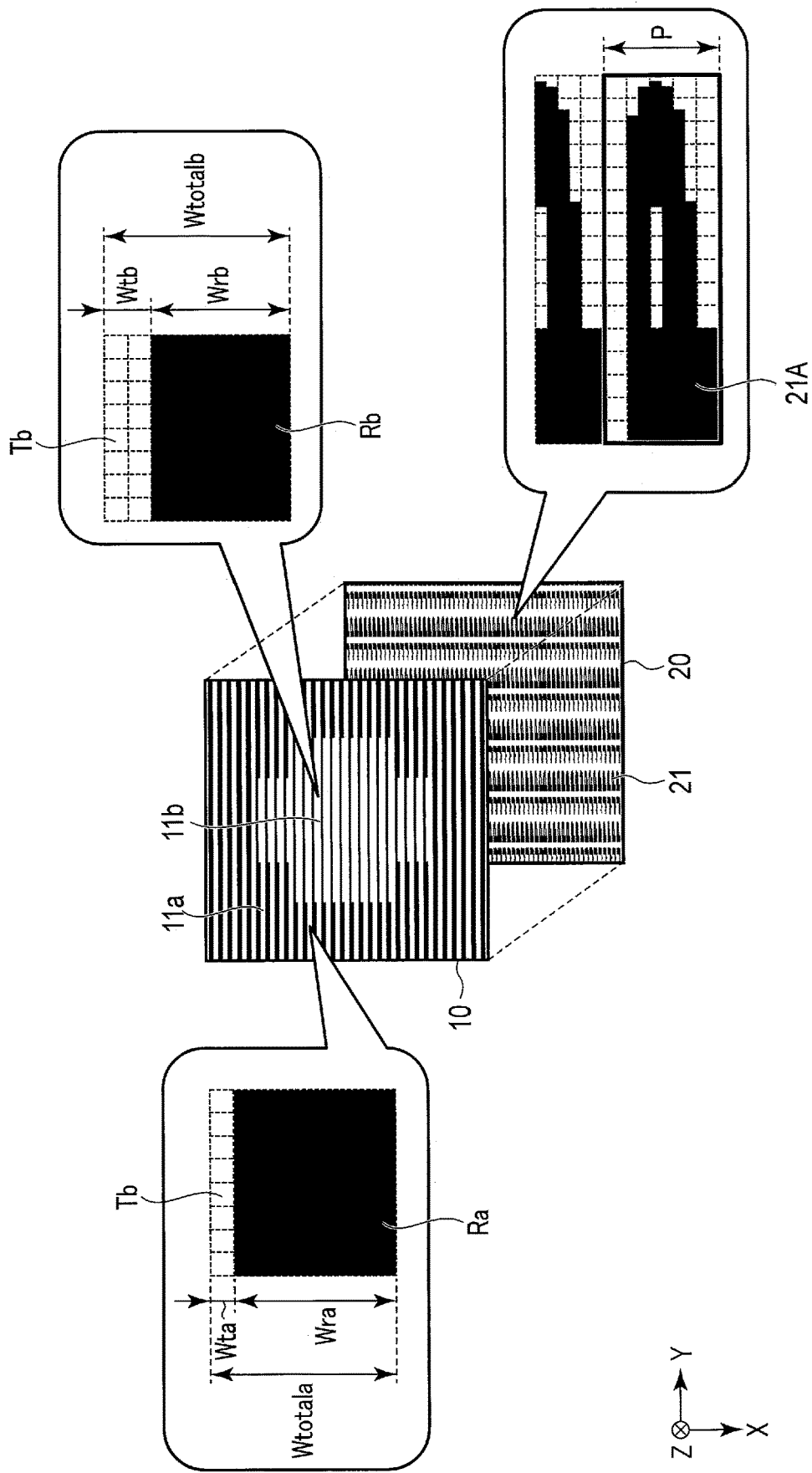
F I G. 10

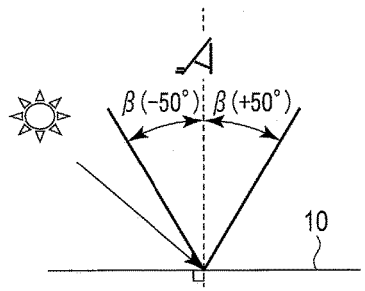
F I G. 14
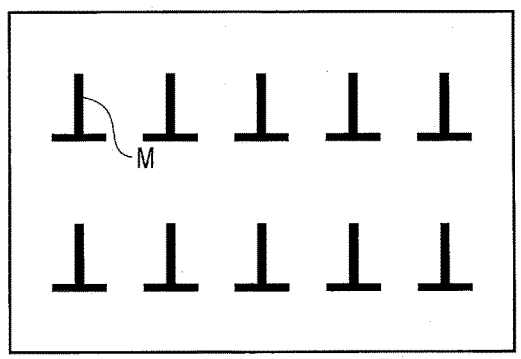
F I G. 15
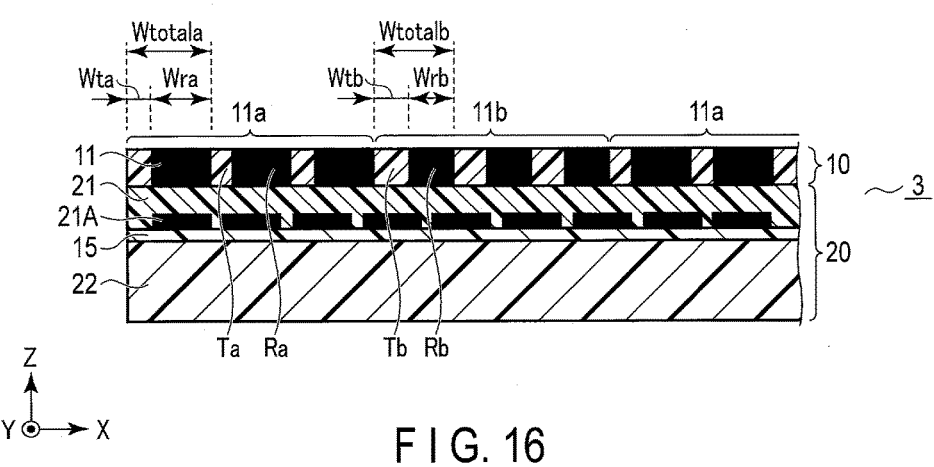
F I G. 16

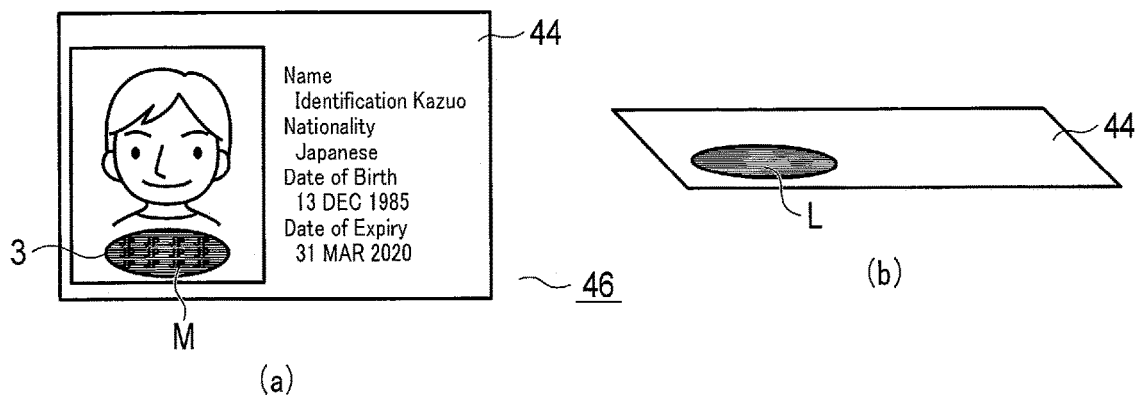
F I G. 19
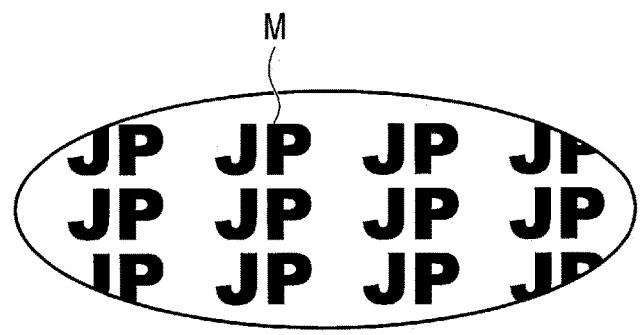
F I G. 20
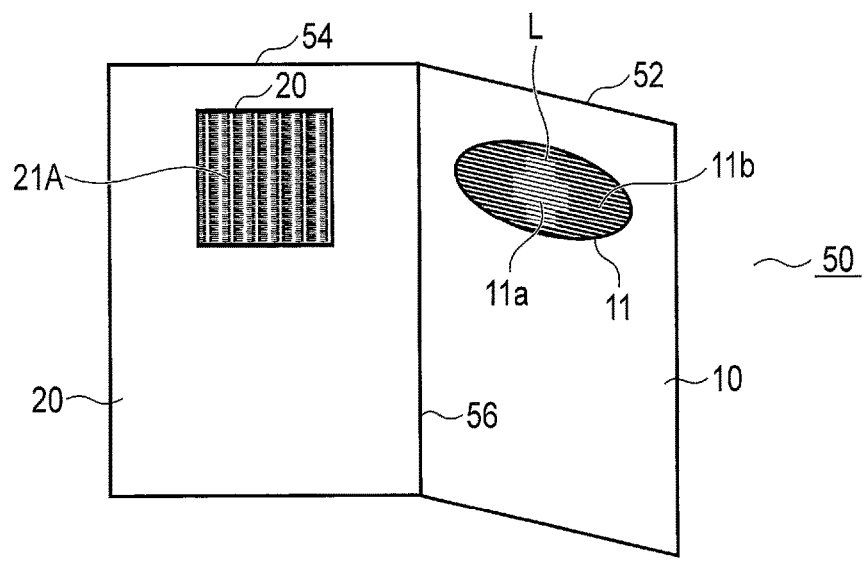
F I G. 21

(a)　　　　　　　　　　　(b)

OPTICAL DISPLAY BODY, PAGE PAIR, PRODUCT, PRINTED PRODUCT, PASSPORT, CARD, BILL, LABEL, TAG, AND TICKET

CROSS-REFERENCE TO RELATED APPLICATION

This application is a Continuation Application of PCT Application No. PCT/JP2019/041390, filed Oct. 21, 2019 and based upon and claiming the benefit of priority from Japanese Patent Application No. 2018-198538, filed Oct. 22, 2018, the entire contents of all of which are incorporated herein by reference.

FIELD

An embodiment of the present invention relates generally to an optical display body applied to anti-counterfeiting and authenticity discrimination of highly valuable media such as passports, ID cards, bills, tickets, securities, etc., as well as to a page pair, a product, a printed product, a passport, a card, a bill, a label, a tag, and a ticket on which the optical display body is placed.

BACKGROUND

As in, for example, Jpn. Pat. Appln. KOKAI Publication No. 557-20395, Jpn. Pat. Appln. KOKAI Publication No. S60-79991, Jpn. Pat. Appln. KOKAI Publication No. 2002-226740, and Jpn. Pat. Appln. KOKAI Publication No. S49-131142, for highly valuable media such as passports, ID cards, bills, tickets, and securities, measures against counterfeit or forgery, such as special watermarked paper, latent image intaglio, or a functional ink whose color is not properly reproduced by a copier, copy-protecting image lines have conventionally been taken.

However, with the recent prevalence of color copiers and the advent of high-functionality photographic plate making machines, for example, as in Jpn. Pat. Appln. KOKAI Publication No. 2006-123174, techniques in counterfeiting or forgery have become more sophisticated, and the risk of crime due to counterfeiting and forgery has also been increasing.

Therefore, recently, in order to prevent counterfeiting and forgery, in addition to the above measures, schemes such as placing of an image pattern formed based on image data and/or an image using an optical thin film employing a hologram, diffraction grating, or multilayer interference which realizes an Optical Variable Device (OVD) on a card substrate such as polyvinyl chloride have also been taken.

According to the OVD, effects such as color shift can be obtained through optical engineering, and complicated optical effects can be realized. The production of such an optical thin film employing a hologram, diffraction grating, or multilayer interference which realizes the OVD requires extremely advanced technology, and reproduction thereof is difficult.

Therefore, optical thin films employing holograms, diffraction gratings, or multilayer interference have been used as effective means for preventing counterfeiting and forgery.

SUMMARY

However, as color copiers and electronic devices have rapidly improved in performance in recent years, it has become difficult to realize a sufficient anti-counterfeiting effect even by application of the optical thin film employing the hologram, diffraction grating, or multilayer interference.

An embodiment of the present invention has been made in view of these circumstances, and has an objective of providing: an optical display body that attains a sufficient anti-counterfeiting effect; a page pair; a product; a printed product; a passport; a card; a bill; a label; a tag; and a ticket on which the optical display body is placed.

A first aspect of the present invention is an optical display body capable of manifesting a visible image, the optical display body including:

a stripe mask including a transmission part and a reflection part that is wider than the transmission part, the transmission part and the reflection part being alternately arranged so as to form a stripe pattern; and a printed body including a flattened design that is the visible image flattened in a first direction, the flattened design being printed on the printed body two or more times repeatedly in a second direction orthogonal to the first direction. The stripe mask includes: a first stripe pattern region in which a transmission part having a first width is arranged; and a second stripe pattern region in which a transmission part having a second width that is greater than the first width is arranged. The stripe mask, upon being superimposed on the printed body such that a stripe direction of the stripe mask will be coincident with the second direction of the printed body, allows the visible image to be displayed through the stripe mask.

A second aspect of the present invention is the optical display body of the first aspect of the present invention, in which a latent image whose shape is defined by a boundary between the first stripe pattern region and the second stripe pattern region is to be displayed.

A third aspect of the present invention is the optical display body of the second aspect of the present invention, in which the visible image is visually confirmed when the stripe mask is observed from a first viewing angle range including a normal direction with respect to the stripe mask, and the latent image is visually confirmed when the stripe mask is observed from a second viewing angle range different from the first viewing angle range.

A fourth aspect of the present invention is the optical display body of any one of the first to third aspects, in which the first stripe pattern region has a stripe pitch which is equal to a stripe pitch in the second stripe pattern region and which differs from an integral multiple of an arrangement pitch of the flattened design in the second direction.

A fifth aspect of the present invention is the optical display body of any one of the first to fourth aspects, in which the flattened design is printed on the printed body two or more times repeatedly further in the first direction.

A sixth aspect of the present invention is a page pair including a first page and a second page so as to realize the optical display body of any one of the first to fifth aspects, in which the stripe mask is placed on the first page, the printed body is placed on the second page, and when the page pair is closed such that the first page and the second page are superimposed on each other, the stripe mask and the printed body are superimposed such that the stripe direction will be coincident with the second direction.

A seventh aspect of the present invention is the page pair of the sixth aspect, in which the page pair is formed by binding the first page and the second page together.

An eighth aspect of the present invention is the page pair of the sixth aspect, in which the stripe mask and the printed body are arranged on the same face, and the same face when being folded includes one side as the first page on which the stripe mask is placed, and another side as the second page on which the printed body is placed, taking the folding line as a boundary.

A ninth aspect of the present invention is a product on which the optical display body of any one of the first to fifth aspects is placed.

A tenth aspect of the present invention is the product of the ninth aspect, in which the product is a printed product.

An eleventh aspect of the present invention is a passport on which the optical display body of any one of the first to fifth aspects is placed.

A twelfth aspect of the present invention is a card on which the optical display body of any one of the first to fifth aspects is placed.

A thirteenth aspect of the present invention is a bill on which the optical display body of any one of the first to fifth aspects is placed.

A fourteenth aspect of the present invention is a label on which the optical display body of any one of the first to fifth aspects is placed.

A fifteenth aspect of the present invention is a tag on which the optical display body of any one of the first to fifth aspects is placed.

A sixteenth aspect of the present invention is a ticket on which the optical display body of any one of the first to fifth aspects is placed. According to the optical display body of the first aspect of the present invention, part of the flattened design printed on the printed body is hidden with the stripe mask, which makes it possible to display the visible image, which is an image before flattening for the flattened design that is difficult to distinguish with the printed body alone, and the security thus can be improved.

According to the optical display body of the second aspect of the present invention, the latent image whose shape is defined by the boundary between the first stripe pattern region and the second stripe pattern region can be displayed, and thus, two types of information of the visible image and the latent image can be displayed, and thereby the security can be further improved.

According to the optical display body of the third aspect of the present invention, the image to be visually confirmed can be selectively switched by changing an angle in observing the stripe mask, and the security thus can be further improved.

According to the optical display body of the fourth aspect of the present invention, the visible image can be displayed.

According to the optical display body of the fifth aspect of the present invention, plural identical visible images can be displayed concurrently.

According to the page pair of the sixth aspect of the present invention, the optical display body of the first aspect of the present invention can be realized. Such a page pair is preferably applied to, for example, a passport; and when the page pair is applied to a passport, for example, an immigration officer can easily determine whether the passport is genuine or not depending on whether the first page and the second page upon being superimposed allow the correct visible image to be displayed.

As for the structure of the page pair, even when the first page and the second page are bound together as in the page pair of the seventh aspect of the present invention, the page pair can be configured such that the first page and the second page are placed on the same face that is to be folded at the time of use, as in the page pair of the seventh aspect of the present invention.

According to the product of the ninth aspect of the present invention, the high security attained by the optical display body of the first aspect of the present invention can be provided.

According to the product of the tenth aspect of the present invention, it is possible to realize a printed product having such high security.

According to the product of the eleventh aspect of the present invention, it is possible to realize a passport having such high security.

According to the product of the twelfth aspect of the present invention, it is possible to realize a card having such high security.

According to the product of the thirteenth aspect of the present invention, it is possible to realize a bill having such high security.

According to the product of the fourteenth aspect of the present invention, it is possible to realize a label having such high security.

According to the product of the fifteenth aspect of the present invention, it is possible to realize a tag having such high security.

According to the product of the sixteenth aspect of the present invention, it is possible to realize a ticket having such high security.

As described above, according to the embodiment of the present invention, there can be provided: the optical display body that attains the sufficient anti-counterfeiting effect; and the page pair, the product, the printed product, the passport, the card, the bill, the label, the tag, and the ticket on which the optical display body is placed.

BRIEF DESCRIPTION OF THE DRAWINGS

FIG. 1 is a cross-sectional view of an example schematic configuration of an optical display body according to an embodiment of the present invention.

FIG. 2 is a plan view for explaining an example of a flattened design layer.

FIG. 3 is a plan view of a visible image that is a design before flattening for a flattened design.

FIG. 4 is a cross-sectional view of another example schematic configuration of the optical display body according to the embodiment of the present invention.

FIG. 5 is a plan view of an example stripe mask in which a design defined by a boundary between different stripe pattern regions is formed.

FIG. 6 is a plan view of another example stripe mask in which a design defined by a boundary between different stripe pattern regions is formed.

FIG. 7 is a conceptual diagram for explaining a viewing angle range in which a latent image can be visually confirmed.

FIG. 8 is a conceptual diagram illustrating a latent image visually confirmed.

FIG. 10 is a conceptual diagram showing in detail a positional relationship between a stripe mask and a printed body in the XY plane in order to explain the mechanism for manifesting a visible image.

FIG. 14 is a conceptual diagram for explaining a viewing angle range in which a visible image can be visually confirmed.

FIG. 15 is a conceptual diagram illustrating visible images visually confirmed.

FIG. 16 is a cross-sectional view of an example of modification 1 of the optical display body according to the embodiment of the present invention.

FIG. 19 is a top view (a) and a perspective view (b) schematically showing an example plane structure of an ID card.

FIG. 20 is a schematic diagram showing an example visible image observed when a data page is viewed from its front side.

FIG. 21 is a conceptual diagram showing an example configuration of a page pair in which a stripe mask and a printed body are placed on different pages.

DETAILED DESCRIPTION

Figure 9:
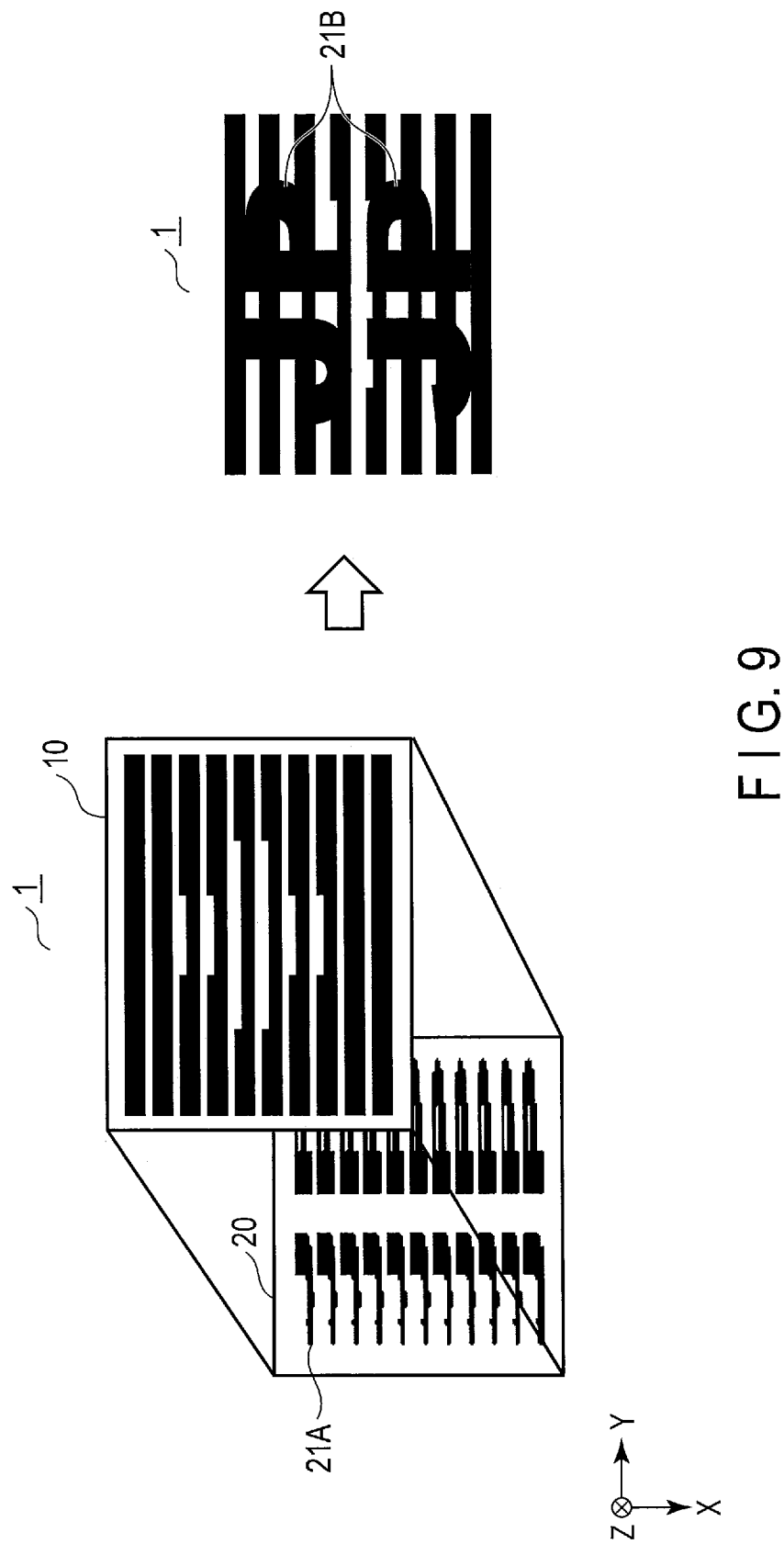
FIG. 9 is a conceptual diagram for explaining a positional relationship between a stripe mask and a printed body in an XY plane.

Hereinafter, embodiments of the present invention will be described in detail with reference to the drawings. Throughout the drawings, structural elements that perform the same function or similar functions are assigned with the same reference numeral, and redundant descriptions will be omitted.

FIG. 1 is a cross-sectional view of an example schematic configuration of an optical display body according to an embodiment of the present invention.

An optical display body 1 is configured by stacking a stripe mask 10 and a printed body 20.

The stripe mask 10 includes a stripe layer 11 in which linear transmission parts T and reflection parts R extending in the Y direction are alternately arranged in the X direction in the drawing, thereby forming a stripe pattern.

The transmission part T can be the stripe layer 11 as it is, or can be, for example, a transparent reflection layer. In other words, the transparent reflection layer can be the transmission part T. When the transparent reflection layer is taken as the transmission part T, the transmission part T can be formed by a vacuum film forming method such as vacuum evaporation or sputtering.

Alternatively, the transmission part T can be a metal layer having a thickness of less than 20 nm. The metal layer may be thicker than 5 nm. Material for this metal layer can be, for example, chromium, nickel, aluminum, iron, titanium, silver, gold, copper, or an alloy thereof.

For the reflection part R, a metal reflection layer having a concealing property can be used. In other words, the metal layer having a concealing property can be the reflection part R. The reflection part R can be formed by a vacuum film forming method such as vacuum evaporation or sputtering. Note that the reflection part R may be printed. This printing can be performed through gravure printing, offset printing, or screen printing. An ink for the printing can be a pigment ink or a dye ink. The ink may also be pearl ink. Further, the reflection part R may have a light-scattering property. The light-scattering reflection part R can be formed through printing, embossing, or extrusion molding. The light-scattering reflection part R can be realized by containing a scatterer having an uneven surface, a low refractive index, or a high refractive index.

Examples of the material of the metal reflection layer for the reflection part R can include chromium, nickel, aluminum, iron, titanium, silver, gold, and copper. The metal reflection layer for the reflection part R typically has a thickness of from 50 nm to 100 nm. With this thickness, it is possible to impart a concealing property appropriate for the stripe mask, and it has excellent manufacturability.

The stripe layer 11 includes multiple types of stripe pattern regions that are classified according to a width Wt of the transmission part T in the X direction. In FIG. 1, two types of a stripe pattern region 11a and a stripe pattern region 11b are illustrated as an example.

The stripe pattern region 11a is a region in which the transmission part T has a smaller width Wt in the X direction, and the stripe pattern region 11b is a region in which the transmission part T has a larger width Wt in the X direction. That is, when the transmission part T in the stripe pattern region 11a is taken as a transmission part Ta and the transmission part T in the stripe pattern region 11b is taken as a transmission part Tb, a width Wta and a width Wtb have a relationship of Wta<Wtb.

However, in any stripe pattern region 11, the width Wt of the transmission part T in the X direction is smaller than the width Wr of the reflection part R in the X direction, and a relationship of Wt<Wr holds.

Further, regardless of the type of the stripe pattern region 11, a total width Wtotal (hereinafter, also referred to as "a stripe pitch") of a width Wt of the transmission part T in the X direction and a width Wr of its adjacent reflection part R in the X direction is constant in the region. Therefore, a total width Wtotala (a stripe pitch of the stripe pattern region 11a) of the width Wta of the transmission part Ta in the X direction and a width Wra of its adjacent reflection part Ra in the X direction in the stripe pattern region 11a, and a total width Wtotalb (a stripe pitch of the stripe pattern region 11b) of the width Wtb of the transmission part Tb in the X direction and a width Wrb of its adjacent reflection part Rb in the X direction in the stripe pattern region 11b have the following relationships:

$Wta + Wra = Wtotala;$ $Wtb + Wrb = Wtotalb;$ and $Wtotala = Wtotalb.$

Note that although FIG. 1 illustrates only two stripe pattern regions 11a and one stripe pattern region 11b, the number, size, and layout of the stripe pattern region 11a and the stripe pattern region 11b arranged in the stripe mask 10 can be optionally designed, provided that the relationships of Wta<Wtb, Wt<Wr, Wta+Wra=Wtotala, Wtb+Wrb=Wtotalb, and Wtotala=Wtotalb are maintained.

Further, although FIG. 1 illustrates only two types of the stripe pattern region, 11a and 11b, the stripe layer 11 can include three or more types of the stripe pattern region.

The stripe layer 11 is translucent and typically transparent. Material of the stripe layer 11 can be, for example, a film or sheet made of resin; material of the resin can be, for example, polyethylene terephthalate (PET), polypropylene (PP), polycarbonate (PC), polymethylmethacrylate (PMMA), polyethylene (PE), or the like.

The stripe layer 11 can also include a diffraction structure such as at least one of a hologram or a diffraction grating. For example, a relief structure can be provided as the diffraction structure on the surface of a transparent resin forming the stripe layer 11. This allows a more complicated display; for example, it is possible to superimpose an image displayed through the diffraction structure on a latent image or a visible image to be described later or to arrange them side by side. This complicated display can enhance the difficulty in counterfeiting.

When the stripe layer 11 includes the diffraction structure, material of the stripe layer 11 can be a curable resin or a thermoplastic resin. Examples of the curable resin that cures through light can be acrylics, fluoroacrylics, silicone acrylics, epoxy acrylates, methylstyrenes, and fluorene polymers. Examples of the curable resin that cures through heat include thermosetting resins such as acrylonitrile styrene copolymers, phenols, melamines, urea resins, and alkyd resins. Examples of the thermoplastic resin include polycarbonate, polypropylene, polyethylene terephthalate, polystyrene, cycloolefin polymers, and polyacetals. The diffraction structure can be formed on the surface of a release layer by shaping the above resin into a desired structure and then subjecting it to curing.

Note that the cured resins forming the diffraction structure are all transparent to light and commonly have a refractive index of about 1.5; the refractive index can be greater than 1.4 and less than 1.65.

The printed body 20 is formed of a carrier 22 and a flattened design layer 21 formed on the carrier 22. The flattened design layer 21 is composed of material having a decent adhesion to the carrier 22.

The flattened design layer 21 can be a film or sheet made of resin. Material of the flattened design layer 21 can be polyethylene terephthalate (PET), polypropylene (PP), polycarbonate (PC), polymethylmethacrylate (PMMA), polyethylene (PE), or the like.

FIG. 2 is a plan view for explaining an example of the flattened design layer 21.

In the flattened design layer 21, as shown in FIG. 2, a flattened design 21A that is the visible image flattened in the Y direction in the figure is printed two or more times repeatedly in the X direction in the figure.

FIG. 3 is a plan view of a visible image that is a design before flattening for a single flattened design illustrated in FIG. 2.

For example, when a visible image 21B is the characters "JP" as shown in FIG. 3, the single flattened design 21A shown in FIG. 2 is a "JP" that is flattened in the Y direction. As described above, in the flattened design layer 21, the flattened design 21A that is the visible image such as a "JP" flattened in the Y direction is printed two or more times repeatedly in the X direction. Note that the visible image 21B is not limited to a character or a design and can be a code related to an owner.

The flattened design 21A can be composed of a dye and a pigment. In this case, for the formation of the flattened design 21A, a thermal transfer recording method with a thermal head, a printing method such as an inkjet recording method, an electrophotographic method, or a combination of two or more thereof can be used. Alternatively, the flattened design 21A can be formed by drawing with a laser beam on a layer containing a thermosensitive color former. Alternatively, a combination of these methods can be used.

The flattened design 21A can consist only of, for example, black ink. Alternatively, the flattened design 21A can be composed of an ink in any one or more colors of cyan, yellow, or magenta.

When the flattened design 21A is composed of inks in any two or more colors of cyan, yellow, or magenta, it is desirable that the inks of two or more colors be shaped into dots that overlap in a predetermined area. In this case, it is difficult to copy the printed body with a color copier or the like, which can enhance the anti-counterfeiting and anti-falsification effects.

Material of the carrier 22 can be, for example, paper. The material of the carrier 22 can also be, for example, a plastic substrate, a metal substrate, a ceramic substrate, or a glass substrate.

FIG. 4 is a cross-sectional view of another example schematic configuration of the optical display body according to the embodiment of the present invention.

The optical display body 2 shown in FIG. 4 has the stripe mask 10 and the printed body 20 separated. In such a case, the stripe mask 10 includes a transparent carrier 12 in addition to the stripe layer 11 described with reference to FIG. 1. The printed body 20, on the other hand, includes the flattened design layer 21 and the carrier 22 as in the configuration described with reference to FIG. 1.

In FIG. 4, the stripe mask 10 is the same as that in FIG. 1 except that the transparent carrier 12 is included; thus, a difference from FIG. 1 will be described below to avoid redundant descriptions.

The transparent carrier 12 has a light transmission property and is typically transparent. The transparent carrier 12 can be a plastic film or a plastic sheet. Material of the transparent carrier 12 can be polyethylene terephthalate (PET), polypropylene (PP), polycarbonate (PC), polymethylmethacrylate (PMMA), or polyethylene (PE).

FIGS. 5 and 6 are example plan views of the stripe mask 10 in which a design defined by a boundary of the stripe pattern region 11a and the stripe pattern region 11b is formed.

As illustrated in FIGS. 5 and 6, when the arrangement of the stripe pattern region 11a and the stripe pattern region 11b is changed with their stripe directions kept coincident with the X direction in the stripe mask 10, the shape defined by the boundary between the pattern region 11a and the pattern region 11b also changes.

Further, the proportion between the transmission part T and the reflection part R in the stripe pitch Wtotal is different between the stripe pattern region 11a and the stripe pattern region 11b. That is, the stripe mask 10 can include regions having different proportions between the transmission part T and the reflection part R. In this case, the stripe pattern region 11a and the stripe pattern region 11b have different reflected-light intensity distributions for light. By utilizing this difference in reflected-light intensity distribution, the shape defined by the boundary between the stripe pattern region 11a and the stripe pattern region 11b can be made to manifest as a latent image on the XY plane of the stripe mask 10.

FIGS. 5 and 6 both show examples in which a cross shape is defined in the center; however, FIG. 5 shows the cross shape defined by the stripe pattern region 11b being arranged around the stripe pattern region 11a, while FIG. 6 shows the cross shape defined by the stripe pattern region 11a being arranged around the stripe pattern region 11b. In such a case, the cross shape manifests as a bright cross-shaped latent image L1 in FIG. 5, while it manifests as a dark cross-shaped latent image L2 in FIG. 6.

FIG. 7 is a conceptual diagram for explaining a viewing angle range in which a latent image L can be visually confirmed.

FIG. 8 is a conceptual diagram illustrating the latent image L that is visually confirmed. The stripe mask 10 can visualize the latent image L. The stripe mask 10 serves as a visible image filter. The visible image filter visualizes the latent image L.

As shown in FIG. 7, the latent image L, upon being observed from a viewing angle range α (for example, 20 to 40° from the surface of the stripe mask 10) that is acute with respect to the face of the stripe mask 10, is well visually confirmed as shown in FIG. 8.

FIG. 9 is a conceptual diagram for explaining a positional relationship between the stripe mask and the printed body in the XY plane.

The optical display body 1 is configured by superimposing the stripe mask 10 and the printed body 20 such that the stripe direction (X direction) of the stripe mask 10 and the X direction of the printed body 20 coincide with each other.

By the stripe mask 10 thus being superimposed on the printed body 20 that includes the flattened design layer 21 in which multiple flattened designs 21A are regularly arranged, the visible image 21B that can be visually confirmed manifests. The mechanism of such a manifestation of the visible image 21B will be explained as follows. The visible image 21B is an image in which the latent image manifests.

Figure 11:
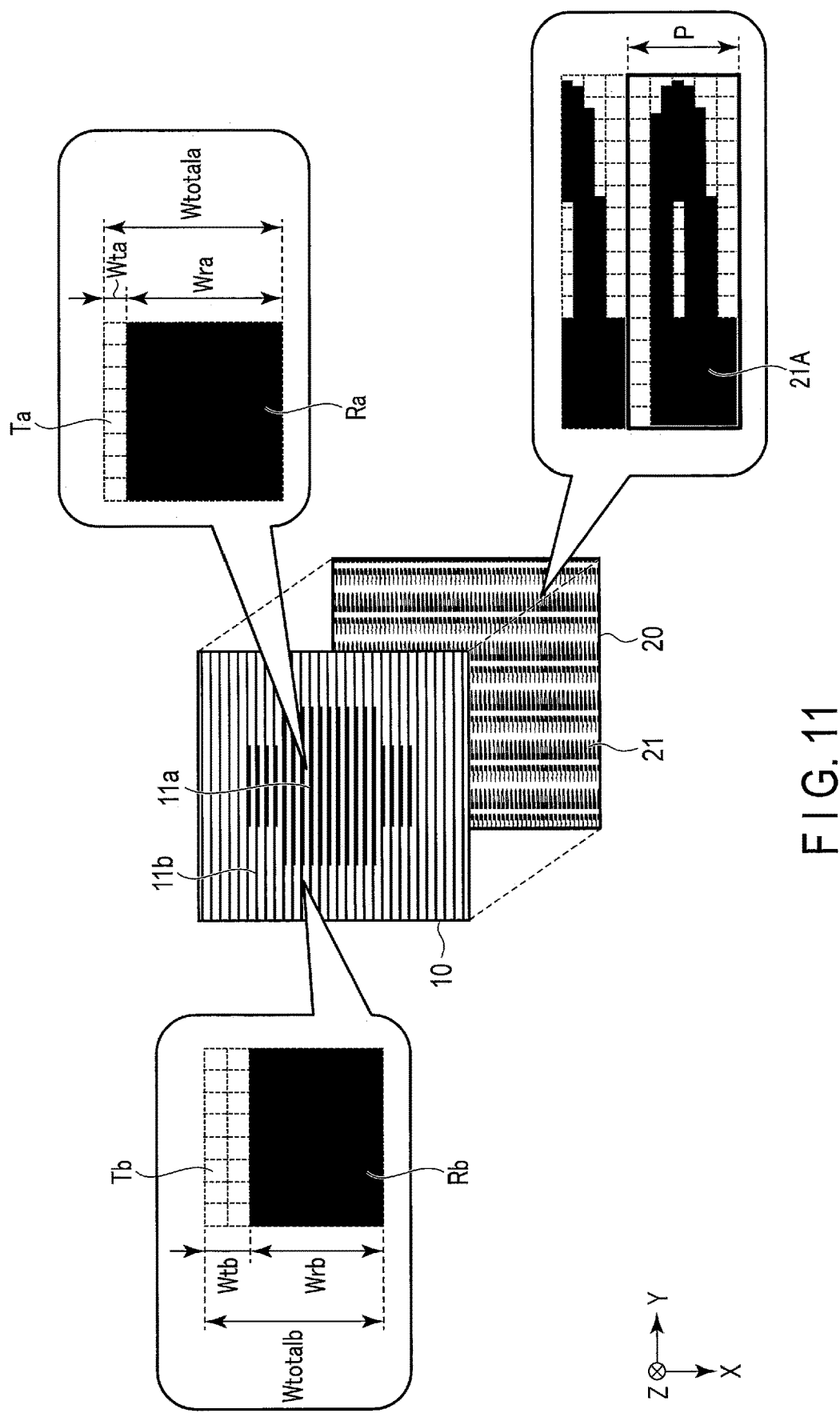
FIG. 11 is a conceptual diagram showing in detail a positional relationship between a stripe mask and a printed body in the XY plane in order to explain the principles on which a visible image manifests.

FIGS. 10 and 11 are conceptual diagrams showing in detail positional relationships between the stripe mask and the printed body in the XY plane in order to explain the mechanism through which the visible image manifests.

FIG. 10 shows the stripe mask 10 illustrated in FIG. 6, and FIG. 11 shows the stripe mask 10 illustrated in FIG. 5. Further, in both FIGS. 10 and 11, the flattened design 21A as illustrated in FIG. 2 is placed in the flattened design layer 21 of the printed body 20. The flattened design 21A is, for example, black ink that is thermally transferred into a predetermined size, for example, into a dot shape; alternatively, any one or more colors of cyan, yellow, or magenta may be thermally transferred into a predetermined size.

In the stripe mask 10 shown in FIGS. 10 and 11, the stripe pitch Wtotal (Wtotal=Wtotala=Wtotalb) is designed to differ from an integral multiple of an arrangement pitch P in which the flattened design 21A is repeatedly arranged in the X direction in the printed body 20. That is, the relationship of Wtotal≠nP (n is a positive integer) holds. Typically, the stripe pitch Wtotal can have a deviation amount of ±10% or more and 25% or less with respect to the arrangement pitch P.

The stripe pitch Wtotal differing from the integral multiple of the arrangement pitch P allows the visible image 21B to manifest. This mechanism will be explained using FIGS. 12 and 13.

Figure 12:
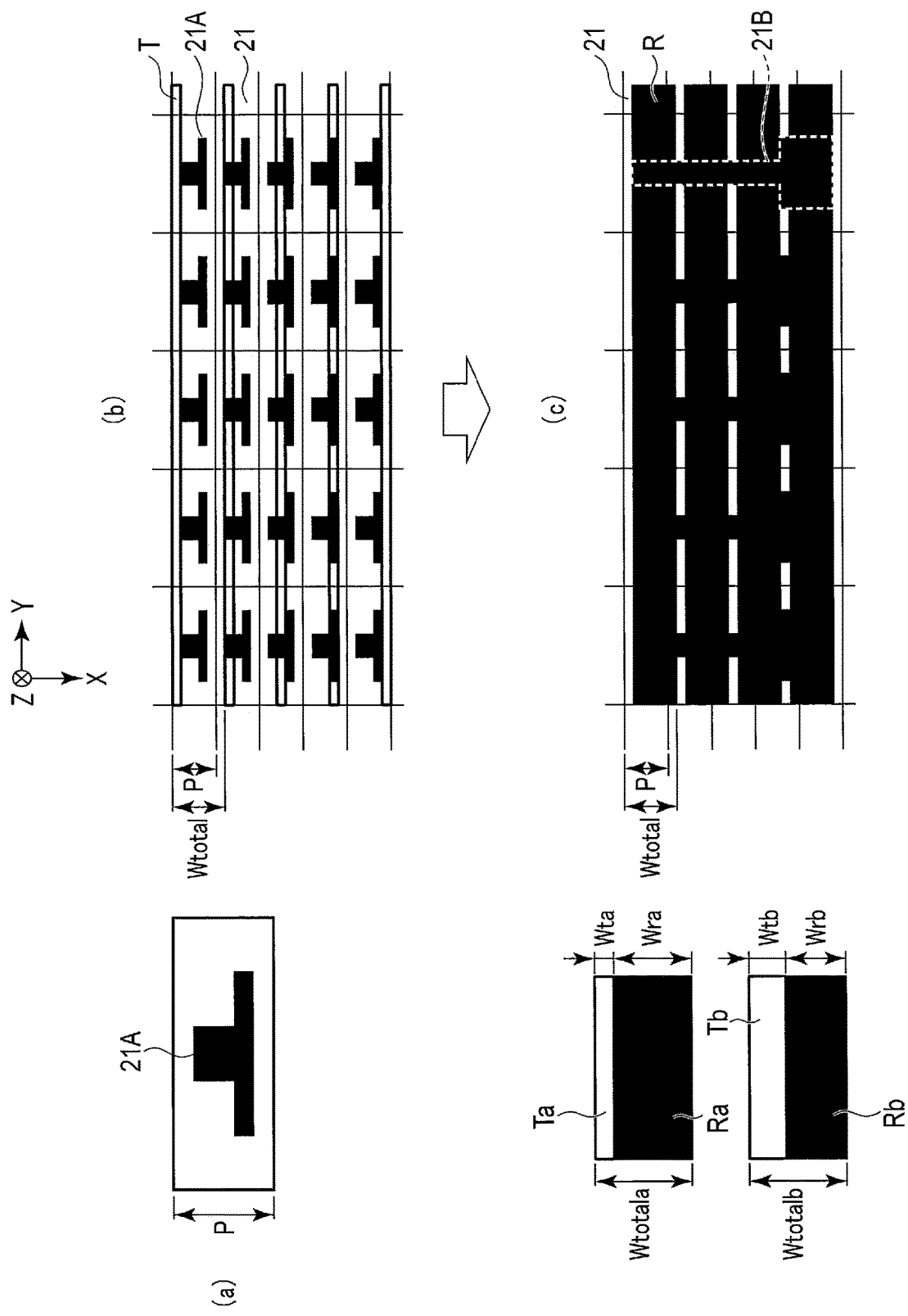
FIG. 12 is an enlarged view of a part of a stripe mask superimposed on a printed body to schematically illustrate the mechanism for manifesting a visible image.
Figure 13:
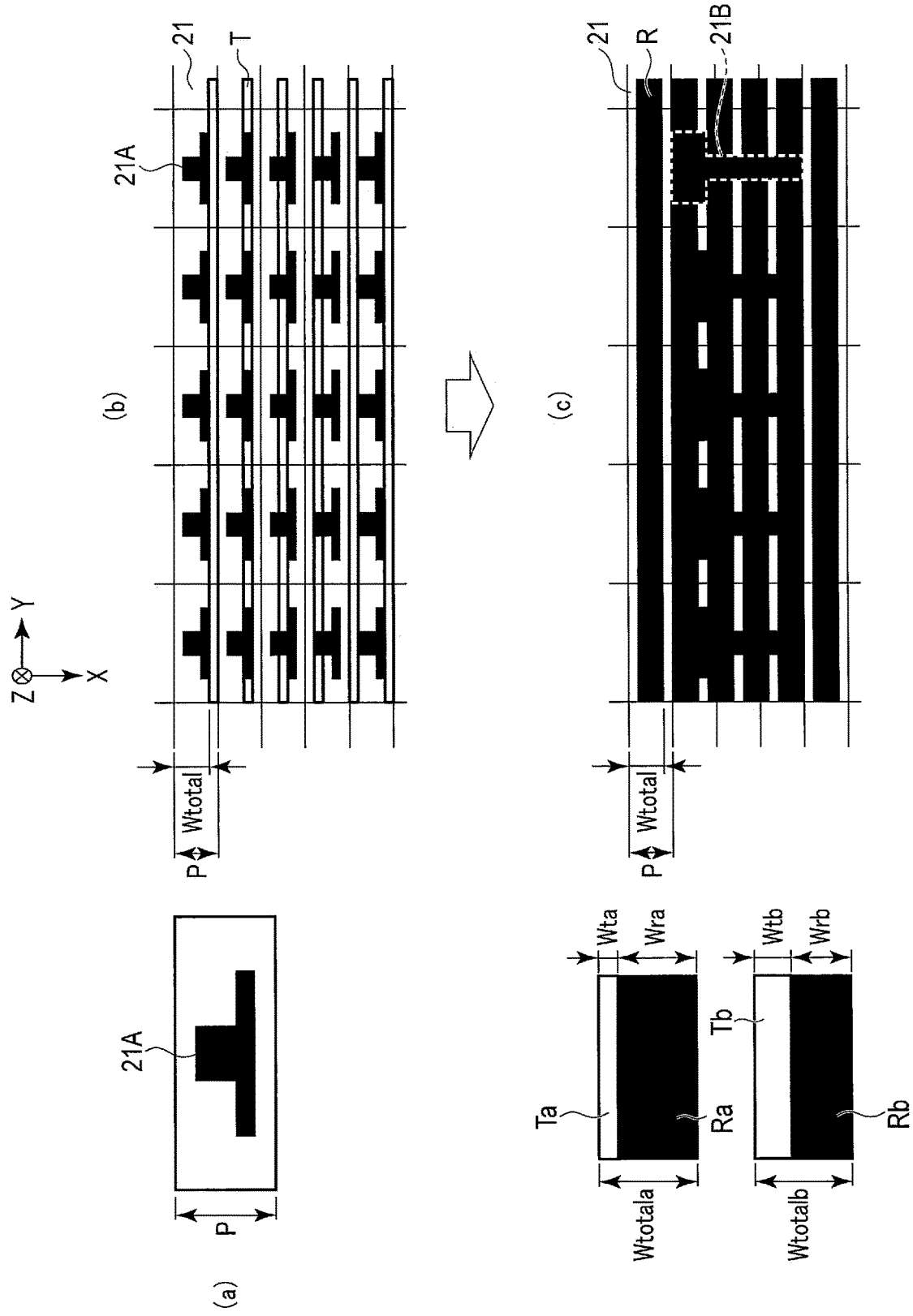
FIG. 13 is an enlarged view of a part of a stripe mask superimposed on a printed body to schematically illustrate the mechanism for manifesting a visible image.

FIGS. 12 and 13 are enlarged views of part of the printed body with the stripe mask superimposed thereon in order to schematically explain the mechanism for the manifestation of the visible image.

FIG. 12(a) and FIG. 13(a) are plan views illustrating a single flattened design 21A that is placed in the flattened design layer 21. FIG. 12(a) and FIG. 13(a), for the sake of explanation, illustrate the flattened design 21A having a design different from that illustrated in FIG. 2.

FIG. 12(b) and FIG. 13(b) are plan views showing the positional relationship between the flattened designs 21A arranged in the X and Y directions at their respective equal pitches on the flattened design layer 21, and the transmission part T of the superimposed stripe mask 10.

FIG. 12(c) and FIG. 13(c) are plan views showing the positional relationship between flattened designs 21A arranged in the X and Y directions at their respective equal pitches on the flattened design layer 21, and the reflection part R of the superimposed stripe mask 10.

In the example shown in FIG. 12, the stripe pitch Wtotal is greater than the arrangement pitch P within the range of from +10% to 25%; in the example shown in FIG. 13, the stripe pitch Wtotal is less than the arrangement pitch P within the range of from −10% to 25%.

When the stripe pitch Wtotal is greater than the arrangement pitch P, the stripe mask 10 upon being superimposed on the printed body 20 allows the visible image 21B before flattening to manifest as shown by a dotted line in FIG. 12(c). On the other hand, when the stripe pitch Wtotal is less than the arrangement pitch P, the stripe mask 10 upon being superimposed on the printed body 20 allows the visible image 21B before flattening to manifest as shown by a dotted line in FIG. 13(c).

In this manner, the manifestation of the visible image 21B before flattening results from the difference between the arrangement pitch P and the stripe pitch Wtotal, which difference causes a site of the flattened design 21A that is observed through the transmission part T of the stripe mask 10 to gradually shift along the X direction in the flattened designs 21A repeatedly arranged in the X direction on the flattened design layer 21. By masking part of the flattened designs 21A with the stripe mask 10 in this manner, the visible image 21B before flattening manifests.

Parallel lines for the visualization may include regions with different stripe pitches Wtotal. The parallel lines may include a plurality of regions having different stripe pitches Wtotal with respect to the arrangement pitch P of the visible image 21B. Thereby, the visible image 21B to be displayed through the parallel lines changes according to the regions.

Further, as an example of this, the parallel lines may include a region where the stripe pitch Wtotal of the parallel lines has a longer pitch than the arrangement pitch P of the visible image 21B, and a region where the stripe pitch Wtotal of the parallel lines has a longer pitch than the arrangement pitch P of the visible image 21B. In this case, even when the visible image 21B is the same, the difference in the region for the visualization can invert the image 21B through the difference in the region for visualization of the parallel lines.

Such visualization is highly discriminating and characteristic, and thus has a high anti-counterfeiting effect. Further, the outer shape of the region may be visible information, and the visible information may be numbers, characters, signs, or symbols. This outer shape can attain highly discriminating visualization information and can further enhance the anti-counterfeiting.

FIG. 14 is a conceptual diagram for explaining a viewing angle range in which a visible image can be visually confirmed.

FIG. 15 is a conceptual diagram illustrating a visible image visually confirmed.

As shown in FIG. 14, the visible image, upon being observed from a viewing angle range β (for example, an angle range of ±50° from the normal direction with respect to the stripe mask 10) centered on the front direction of the stripe mask 10, can be well visually confirmed as shown in FIG. 15. This viewing angle range β can be made not to overlap with the viewing angle range α shown in FIG. 7. In this case, the ability to be visually confirmed can be improved.

Note that depending on the magnitude relationship between the arrangement pitch P and the stripe pitch Wtotal, a vertical relationship of the pre-flattening visible image 21B that is to be manifest is reversed in the X direction. That is, when the stripe pitch Wtotal is greater than the arrangement pitch P, the flattened design 21A and the visible image 21B before flattening have the same vertical relationship as shown in FIG. 12(c); however, when the stripe pitch Wtotal is less than the arrangement pitch P, the vertical relationship between the flattened design 21A and the visible image 21B before flattening is reversed as shown in FIG. 13(c).

When the stripe pitch Wtotal is equal to an integral multiple of the arrangement pitch P (that is, when the relationship of Wtotal=nP holds, where n is a positive integer), the visible image 21B before flattening will not manifest even if the stripe mask 10 is superimposed on the printed body 20. This is because the sites in the flattened designs 21A observed through the transmission part T of the stripe mask 10 will be all the same along the X direction in the flattened designs 21A repeatedly arranged in the X direction on the flattened design layer 21.

A typical stripe pitch Wtotal of the stripe mask 10 is from 250 μm to 500 μm. Further, an example of the width Wta of the transmission part Ta of the stripe pattern region 11a in the X direction is from 30 μm to 70 μm, and the width Wtb of the transmission part Tb of the stripe pattern region 11b in the X direction is, as an example, from 70 μm to 120 μm. A proportion of a portion of the stripe pattern region 11a that is concealed by the reflection part Ra in the entire stripe mask 10 is small, and the visible image 21B before flattening can be visually confirmed with ease from the flattened design 21A of the printed body 20. The area of the flattened design 21A partially shown through the transmission part Tb of the stripe pattern region 11b is small, which makes it easy to visualize the flattened design 21A.

If the width Wta of the transmission part Ta of the stripe pattern region 11a in the X direction is less than 30 μm, a proportion of a portion of the stripe pattern region 11a that is concealed by the reflection part Ra in the entire stripe mask 10 would increase, which makes it difficult to visually confirm the visible image 21B from the flattened design 21A of the printed body 20.

Further, if the width Wtb of the transmission part Tb of the stripe pattern region 11b in the X direction is made greater than 120 μm, the area of the flattened design 21A partially shown through the transmission part Tb of the stripe pattern region 11b would be wider, which in turn makes it difficult to visualize the visible image 21B before flattening.

A typical arrangement pitch P of the flattened design 21A is from 250 μm to 500 μm. Within this range, it is easy to express details about the code related to the owner, which can reduce the risk of counterfeiting or falsification.

If the arrangement pitch P is less than 250 μm, it would be difficult for the flattened design 21A to express details about characters, patterns, or codes related to the owner. Further, if the arrangement pitch P is larger than 500 μm, the resolution of the stripe mask 10 would inevitably tend to be coarse so as to correspond to the flattened design 21A. This will increase the risk of counterfeiting or falsification and thus is not preferable.

As described above, in the optical display body according to the embodiment of the present invention, through the mechanism as described above, when the stripe mask 10 is viewed from the front side, the visible image M can be visually confirmed as shown in FIG. 15, and when the stripe mask 10 is viewed from an oblique side, the latent image L can be visualized as shown in FIG. 8. In this manner, it is possible to switch the types of the image that can be visually confirmed according to the viewing angle range, which can enhance the anti-counterfeiting effect.

(Modification 1)

Next, modification 1 of the optical display body according to the embodiment of the present invention will be described.

In modification 1 of the optical display body according to the embodiment of the present invention, the optical display body provided with an adhesive layer as appropriate will be described.

FIG. 16 is a cross-sectional view of an example of modification 1 of the optical display according to the embodiment of the present invention.

The optical display body 3 illustrated in FIG. 16 is an example modification of the optical display body 1 illustrated in FIG. 1 and differs from the optical display body 1 in that an adhesive layer 15 is provided between the flattened design layer 21 and the carrier 22 in the printed body 20. Therefore, hereinafter, only the difference from the optical display body 1 will be described and redundant descriptions will be omitted.

That is, in the optical display body 3, the flattened design layer 21 and the carrier 22 are bonded to each other by the adhesive layer 15. In order to increase the adhesion, the carrier 22 can be provided with an adhesive anchor layer (not shown) so that the adhesive layer 15 can be provided on the adhesive anchor layer. The adhesive anchor layer may serve as the adhesive layer 15.

Further, as shown in FIG. 4, in the optical display body 2 having the stripe mask 10 and the printed body 20 separated, the adhesive layer can also be provided in order to increase the adhesion between the stripe layer 11 and the transparent carrier 12. In this case, an adhesive anchor layer (not shown) can be provided on the transparent carrier 12, and an adhesive layer can be formed on the adhesive anchor layer to bond the stripe layer 11 to the transparent carrier 12.

Further, the flattened design 21A can be formed directly on the stripe layer 11 not on the flattened design layer 21 through thermal transfer using a thermal head. In this case, the stripe layer 11 can be formed of, for example, the same material as that of the flattened design layer 21. An adhesive anchor layer or an adhesive layer can be provided on the face on a printing side of the stripe layer 11 in order to increase the adhesion.

As described above, the adhesive layer 15 and/or the adhesive anchor layer can be provided for the optical display body 1 or 2 illustrated in FIG. 1 or 4 as appropriate.

(Modification 2)

Next, modification 2 of the optical display body according to the embodiment of the present invention will be described.

In modification 2 of the optical display body according to the embodiment of the present invention, the optical display body in which the surface of the stripe layer 11 is covered with the transparent carrier 12 will be described.

Figure 17:
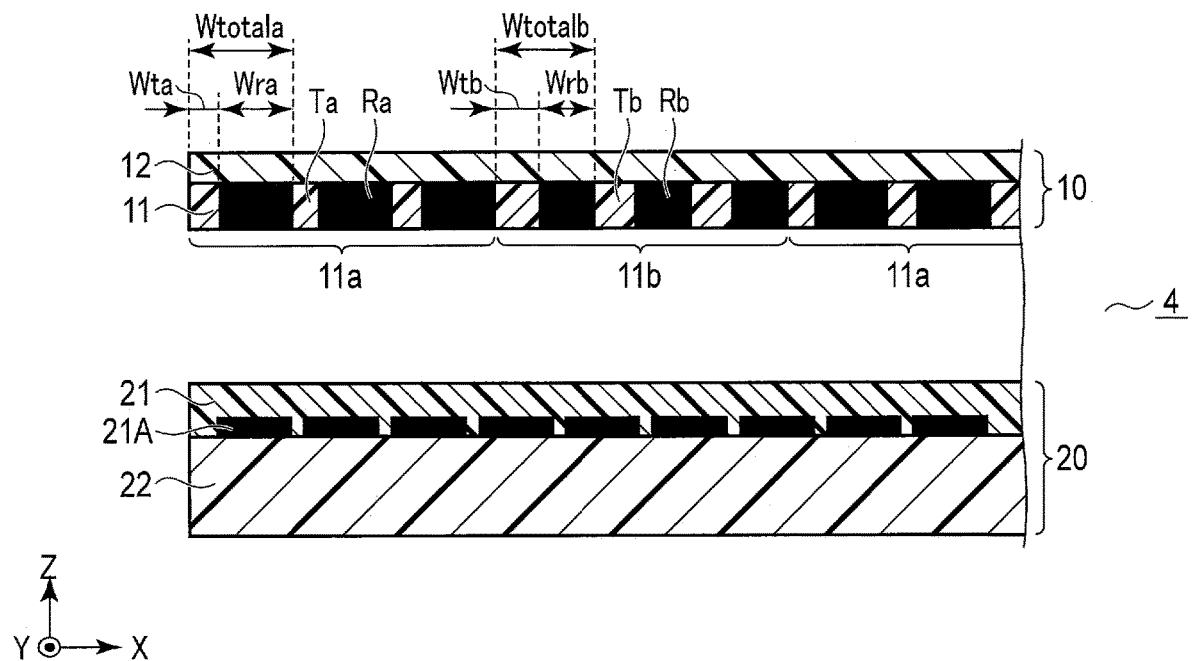
FIG. 17 is a cross-sectional view of an example of modification 2 of the optical display body according to the embodiment of the present invention.

FIG. 17 is a cross-sectional view of an example of modification 2 of the optical display body according to the embodiment of the present invention.

The optical display body 4 illustrated in FIG. 17 is an example modification of the optical display body 2 illustrated in FIG. 4 and differs from the optical display body 2 in that the stripe mask 10 is composed of the stripe layer 11 and the transparent carrier 12 covering the surface of the stripe layer 11. Therefore, hereinafter, only the difference from the optical display body 2 will be described and redundant descriptions will be omitted.

The transparent carrier 12 is for protecting the surface structure of the stripe layer 11, has a light transmission property, and is typically transparent. The transparent carrier 12 is composed of, for example, a film or sheet made of resin, and examples of material of the resin include polyethylene terephthalate (PET), polypropylene (PP), polycarbonate (PC), polymethylmethacrylate (PMMA), and polyethylene (PE).

In the manner described above, the transparent carrier 12 for protecting the surface structure of the stripe layer 11 can be provided.

The optical display body according to the embodiment of the present invention described above can be applied to a product as a security medium for anti-counterfeiting or anti-falsification. The product can be a printed product. The printing can be performed through gravure printing, offset printing, or screen printing. The printed product applied as a security medium can serve as a security print. The security print copes with both anti-counterfeiting and/or anti-falsification and aesthetics. The printed product is, for example, a passport, a card, a bill, a tag, a label, or a ticket. The card can serve as an ID card. The ID card has identification information recorded thereon as either electronic or visible information or as both. The identification information can be biometric information or non-biometric information. Examples of the biometric information include personal signatures, facial photographs, portraits, fingerprints, irises, and a combination thereof. Examples of the non-biometric information include individual names, nationalities, genders, addresses, affiliations, and a combination thereof. Therefore, application of the above embodiment to actual products will be described as implementations below.

[Implementation 1]

In this implementation, an example of applying the optical display body to a passport booklet or a card will be described.

Figure 18:
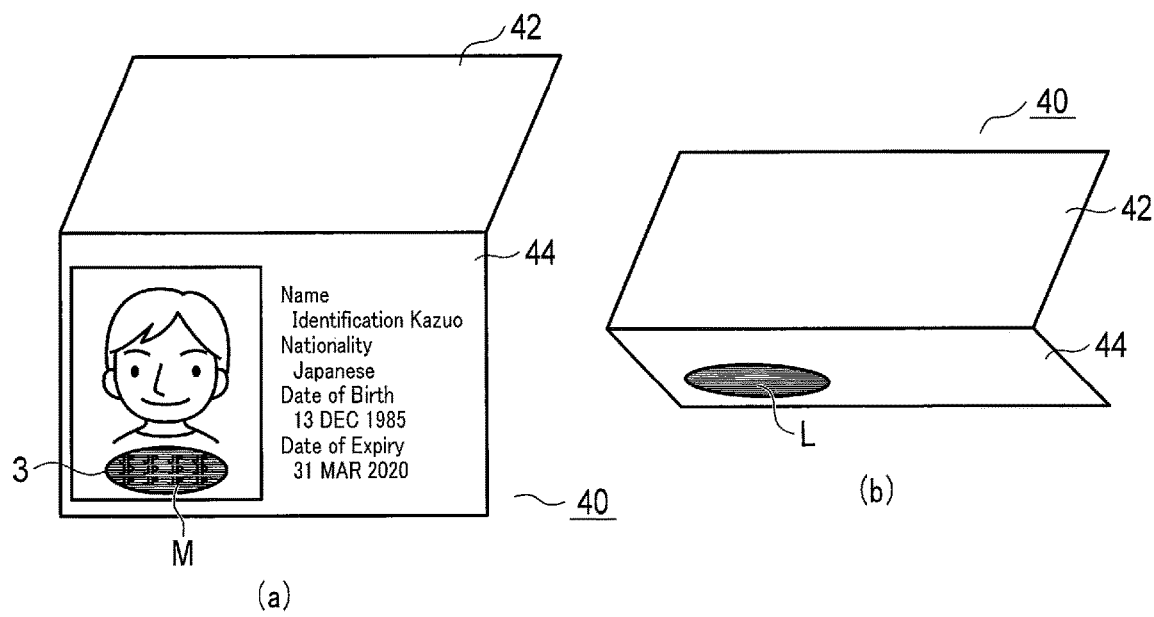
FIG. 18 is a top view (a) and a perspective view (b) schematically showing an example plane structure of a passport booklet.

FIG. 18 is a top view (a) and a perspective view (b) schematically showing an example plane structure of a passport booklet 40 on which the optical display body 3 shown in FIG. 16 is placed.

FIG. 19 is a top view (a) and a perspective view (b) schematically showing an example plane structure of an ID card 46, which is an example card on which the optical display body 3 shown in FIG. 16 is placed.

As illustrated in FIG. 18, the passport booklet 40 is composed of a cover 42, a data page 44, a VISA page (not shown), and the like.

As illustrated in FIG. 19, the ID card 46 is composed of a data page 44 similar to that in the passport booklet 40 illustrated in FIG. 18.

Although the specifications of the data page 44 vary from country to country, the data page 44 illustrated in FIGS. 18 and 19 is formed by coating a page made of paper with a transparent adhesive layer and then placing thereon the optical display body 3, as illustrated in FIG. 16, through thermal transfer.

Note that in the portion of the data page 44 where the optical display body 3 is placed, the paper substrate can be replaced with a plastic substrate, a metal substrate, a ceramic substrate, or a glass substrate.

Hot stamping can be applied to the thermal transfer. Alternatively, a thermal roll or a thermal head instead of the hot stamping can be used to perform the thermal transfer.

Further, at the time of the thermal transfer, an adhesive anchor layer can be formed on the substrate of the data page 44 as appropriate in order to increase the adhesion. When bonding to the carrier 22 of the optical display body 3 is difficult with high adhesion, the thermal transfer can be performed via the adhesive layer as appropriate.

Personal information such as a name, an expiration date, and a face photograph is recorded on the data page 44.

In this implementation, a passport printer (eP600 manufactured by Toppan Printing Co., Ltd.) was used to record the name, expiration date, face photograph, and flattened design 21A. Hereinafter, this recording process will be described.

First, the visible image 21B (for example, the characters "JP" shown in FIG. 3) to be visualized was prepared and enlarged in its breadth by five times using image processing software (Adobe Photoshop), thereby obtaining a flattened design 21A.

Next, an intermediate transfer medium was prepared as the stripe layer 11. As the intermediate transfer medium, a medium composed of a base film, a release/protective layer, and a picture/adhesive layer was used. Then, the stripe pattern regions 11a and 11b were arranged in a part of the picture/adhesive layer so as to form a cross shape at the center, as shown in, for example, FIG. 6.

The stripe pitch Wtotal of the stripe pattern regions 11a and 11b was 425 μm, the width Wra of the reflection part Ra of the stripe pattern region 11a in the X direction was 385 μm, and the width Wrb of the reflection part Rb of the stripe pattern region 11b in the X direction was 340 μm. The width Wr of the reflection part R was realized by demetallizing the evaporated aluminum.

A transfer ribbon was superimposed on the region of the intermediate transfer medium where the evaporated aluminum was demetallized, and a recorded image was formed using a thermal head.

Specifically, first, information such as a name and an expiration date and the flattened design 21A obtained as described above were transferred with black ink, and then cyan, magenta, and yellow inks were sequentially transferred in the face photograph. Note that the arrangement pitch P of the flattened design 21A in the direction (the X direction in FIG. 2) orthogonal to the flattening direction (the Y direction in FIG. 2) was set to 380 μm, which was about 11% less than the stripe pitch Wtotal.

Next, the intermediate transfer medium on which the image was recorded was superimposed on the data page 44 and thermally transferred using a heat roller.

FIG. 20 is a schematic diagram showing an example visible image M observed when the data page 44 shown in FIGS. 18 and 19 is viewed from its front side.

When the data page 44 shown in FIGS. 18 and 19 was viewed from the front side, the visible image 21B (the characters "JP" illustrated in FIG. 12) could be visually confirmed as the visible image M as shown in FIG. 20; and when the data page 44 was viewed from the oblique side, the cross-shaped latent image L could be visually confirmed as shown in FIGS. 18(*b*) and 19(*b*).

In this manner, it was confirmed that since the image to be visually confirmed can be selectively switched by changing an angle to observe the stripe mask 10, the security can further improve.

In this manner, it was confirmed that the security of the passport booklet or ID card is improved by placing the optical display body on the passport booklet or ID card.

[Implementation 2]

In implementation 1, there has been described the example where the optical display body having the stripe mask 10 and the printed body 20 integrated as shown in FIG. 16 was applied and the optical display body was integrally placed on a single object such as the data page 44.

In implementation 2, as shown in FIGS. 4 and 17, there will be described an example page pair where the optical display body having the stripe mask 10 and the printed body 20 separated was applied and the optical display body was integrally placed on each page.

FIG. 21 is a conceptual diagram showing an example configuration of a page pair in which a stripe mask and a printed body are placed on different pages.

In a page pair 50, a page 52 on which the stripe mask 10 is placed and a page 54 on which the printed body 20 is placed are paired. The page 52 and the page 54 are bound together at a center line 56 by gluing or the like. The center line 56 is also used as a folding line for such folding that the page 52 and the page 54 are superimposed on each other.

Figure 22:
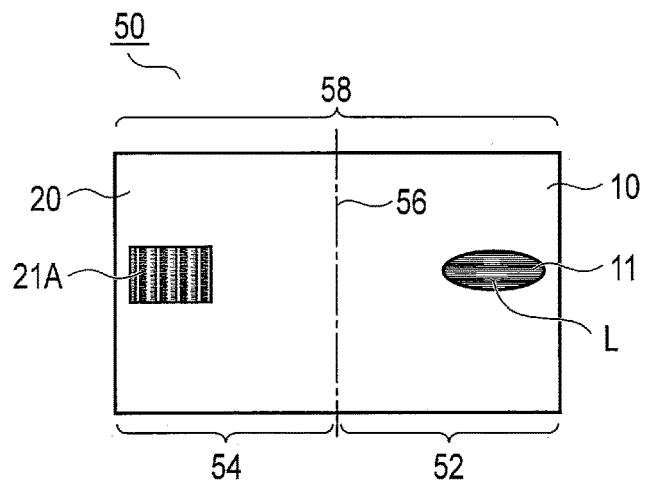
FIG. 22 is a conceptual diagram showing another example configuration of the page pair.

FIG. 22 is a conceptual diagram showing another example configuration of the page pair.

The page pair 50 is not limited to the configuration in which the page 52 and the page 54 are composed of individual faces that are originally separated, as shown in FIG. 21, and the page 52 and the page 54 may be composed of the same face 58 as shown in FIG. 22. That is, the page pair 50 shown in FIG. 22 is configured such that the same face 58 made of, for example, paper can be folded at the center line 56. Thereby, for example, taking the center line 56 as the boundary, the right side in the figure can be regarded as the page 52 and the left side in the figure as the page 54.

Although paper can be used for the pages 52 and 54, for example, a plastic substrate, a metal substrate, a ceramic substrate, or a glass substrate in addition to paper can be used.

In such a page pair 50, the stripe mask 10 was placed on the page 52 in the manner described below.

First, on the page 52, at least the region where the stripe mask 10 was placed was made transparent.

Next, the stripe mask 10 was attached to the surface of the page 52 via an adhesive layer.

Figure 23:
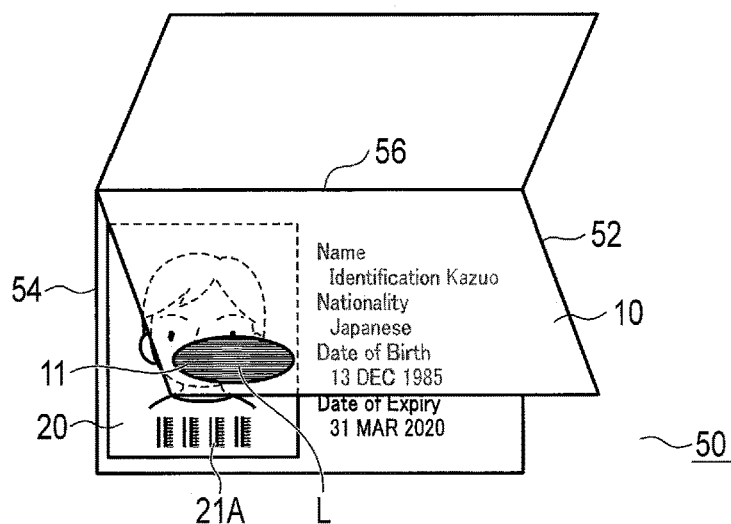
FIG. 23 is a conceptual diagram showing an example page pair in which a stripe mask is placed on a transparent page.

FIG. 23 is a conceptual diagram showing an example page pair in which a stripe mask is placed on a transparent page.

As another way of placing the stripe mask 10 on the page 52, the stripe mask 10 can be transferred to the surface of the page 52 under predetermined pressure and heat. Also, the stripe mask 10 can be placed on the page 52 by sandwiching the stripe mask 10 with carriers (not shown) of the page 52 or embedding the stripe mask 10 in the carrier. When the stripe mask 10 is sandwiched between the carriers of the page 52, the page 52 is provided with a through hole having an area smaller than the area of the stripe layer 11 at a site where the stripe layer 11 is placed, and the stripe layer 11 is placed so as to close the through hole.

Next, the printed body 20 was placed on the page 54. In this case, the printed body 20 was placed on the page 54 by adjusting the placement position such that the page 52 and the page 54, when folded along the center line 56 as shown in FIG. 24, will be superimposed with the stripe direction (X direction) of the stripe layer 11 and the X direction of the printed body 20 coincident with each other.

Figure 24:
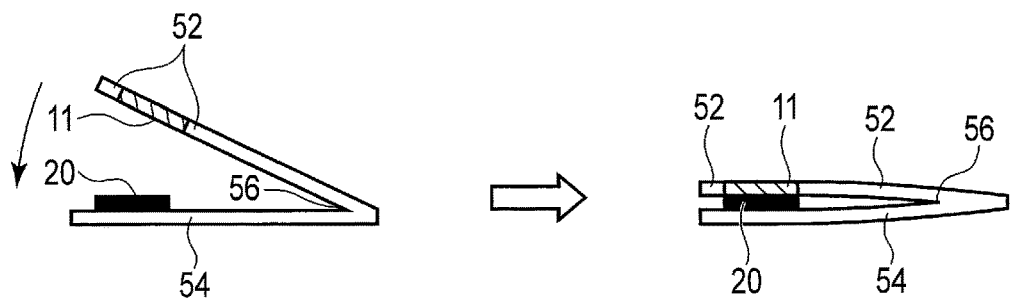
FIG. 24 is a side view of opposing pages folded along a center line.

FIG. 24 is a side view of the page 52 and the page 54 folded along the center line 60.

Figure 25:
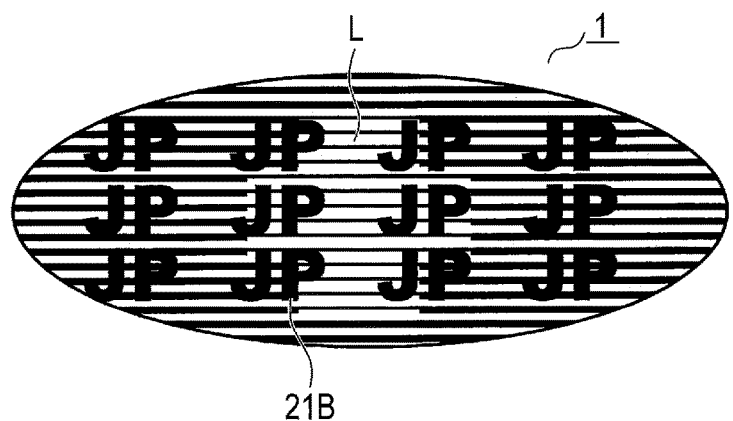
FIG. 25 is a schematic diagram showing an example visible image observed when a data page is viewed from its front side.

FIG. 25 is a schematic diagram showing an example visible image observed when a data page is viewed from its front side.

Figure 26:
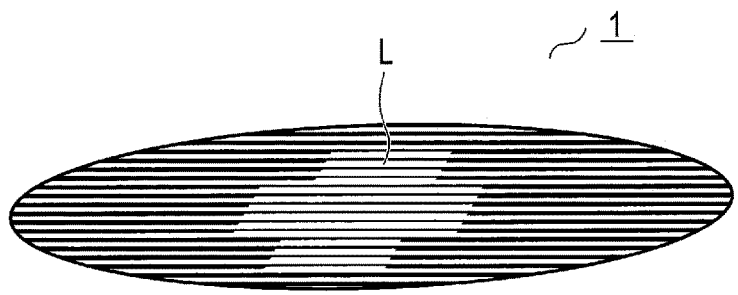
FIG. 26 is a schematic diagram showing an example latent image observed when a data page is viewed from its oblique side.

FIG. 26 is a schematic diagram showing an example latent image observed when a data page is viewed from its oblique side.

When the stripe layer 11 is observed from its front side in a state where the page pair 50 is folded along the central line 56 such that the page 52 and the page 54 are superimposed as shown in FIG. 24, the visible image 21B (the characters "JP") before flattening can be visually confirmed as the visible image 21B, as shown in FIG. 25. Further, when the stripe layer 11 is observed from an oblique direction, the cross-shaped latent image L can be visually confirmed as shown in FIG. 26.

Note that when the stripe layer 11 is observed from an oblique direction with the page 52 and the page 54 not superimposed, that is, with the page 52 and the page 54 open as well, the cross-shaped latent image L can be visually confirmed, as shown in FIG. 26.

As described above, it was confirmed that the security of the page pair 50 can be improved by placing the optical display body having the stripe mask 10 and the print body 20 separated on the page pair 50.

[Implementation 3]

In this implementation, application of the optical display body to a label and/or a tag will be described.

Figure 27:
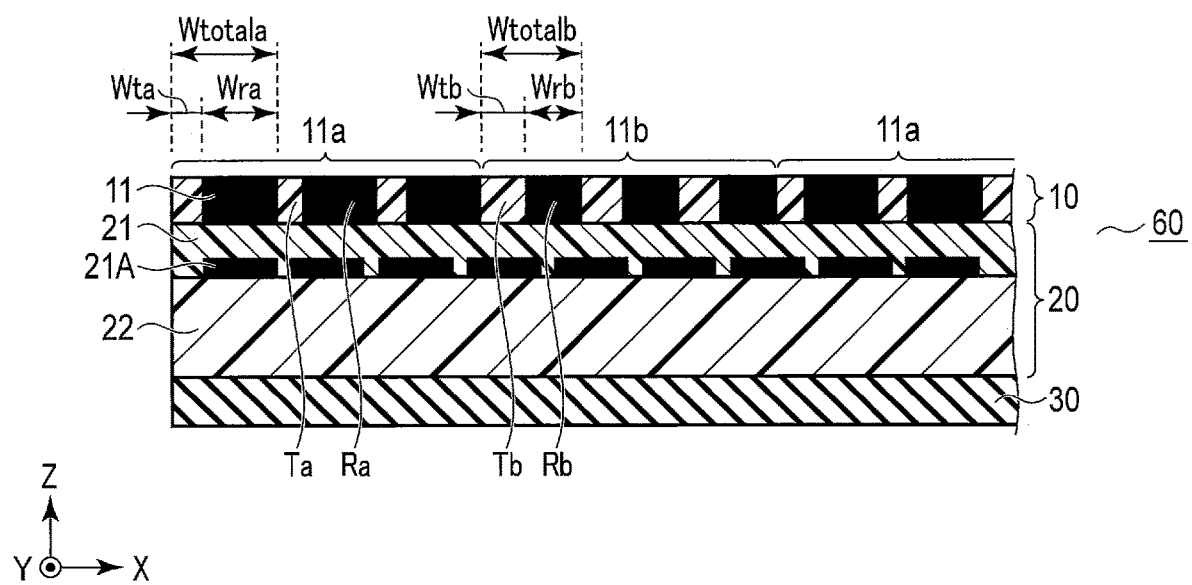
FIG. 27 is a cross-sectional view showing an example configuration of a label.

FIG. 27 is a cross-sectional view showing a configuration of a label 1 configured by providing an adhesive layer on the optical display body shown in FIG. 1.

The optical display body 1 included in the label 60 is configured to allow a character, a pattern, or a code relating to the owner to manifest through the mechanism as described above.

Figure 28:
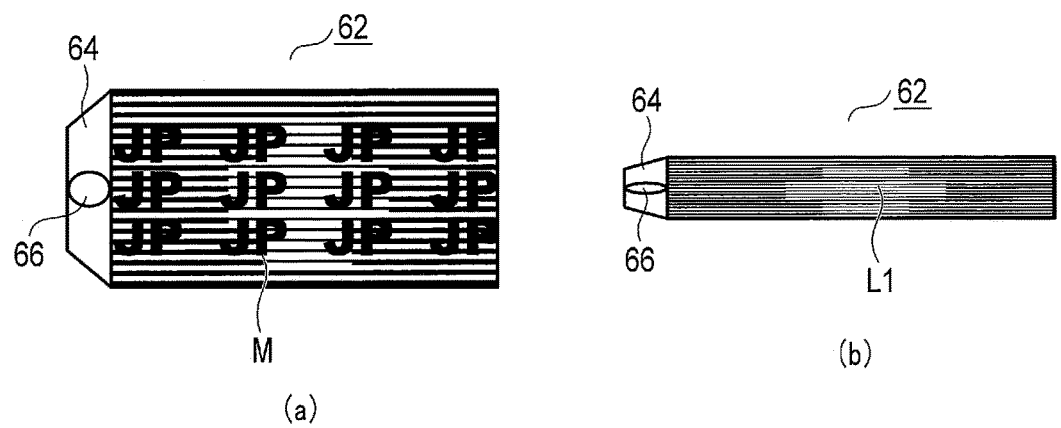
FIG. 28 is a plan view schematically showing an example tag to which a label is attached.
Figure 29:
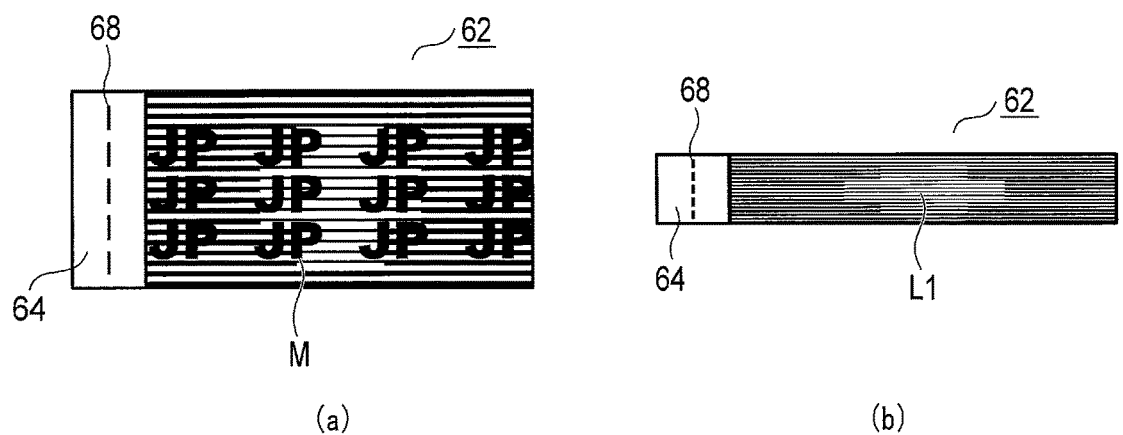
FIG. 29 is a plan view schematically showing another example tag to which the label is attached.

FIGS. 28 and 29 are plan views schematically showing an example tag to which the label shown in FIG. 27 is attached.

The tag 62 as shown in FIGS. 28 and 29 is configured by attaching the label 60 shown in FIG. 27 via the adhesive layer 30.

The substrate of the tag 62 to which the label 60 is attached can be a cloth substrate, a paper substrate, a plastic substrate, a metal substrate, a ceramic substrate, or a glass substrate.

As a result, when viewed from the front side, the visible image 21B such as "JP" was confirmed as the visible image M as shown in FIGS. 28(*a*) and 29(*a*), and when viewed from the oblique side, the latent image L was observed as shown in FIGS. 28(*b*) and 29(*b*).

Further, a tag attachment region 64 can be processed to be provided with a round hole 66 as shown in FIG. 28. Further, the label can be sewn directly onto a product as shown in a sewing line 68 of FIG. 29.

In the manner described above, it was confirmed that even when the optical display body 1 was applied to the label 60 or the tag 62, the image to be visually confirmed can be selectively switched by changing an angle for the observation, and the security thus can be improved.

Therefore, it was also confirmed that the label 60 or the tag 62 can be applied to the authenticity determination of a product by, for example, attaching to or being sewn on a product.

The present invention is not limited to the above-described embodiments, and can be modified in practice, without departing from the gist of the invention. In addition, embodiments may be combined as appropriate, in which case a combined effect is obtained. Furthermore, the above-described embodiments include various inventions, and various inventions can be extracted by an appropriate combination of structural elements selected from a plurality of disclosed structural elements.

The invention claimed is:

1. An optical display body capable of manifesting a visible image, the optical display body comprising:
   a stripe mask including a transmission part and a reflection part that is wider than the transmission part, the transmission part and the reflection part being alternately arranged so as to form a stripe pattern; and
   a printed body including a 2-dimensional flattened design that is the visible image flattened in a first direction, the 2-dimensional flattened design being printed on the printed body two or more times repeatedly in a second direction orthogonal to the first direction,
   the stripe mask including:
      a first stripe pattern region in which a transmission part having a first width is arranged; and
      a second stripe pattern region in which a transmission part having a second width that is larger than the first width is arranged, and
   the stripe mask, upon being superimposed on the printed body such that a stripe direction of the stripe mask will be coincident with the second direction of the printed body, allowing the visible image to be displayed through the stripe mask.

2. The optical display body according to claim 1, wherein a latent image whose shape is defined by a boundary between the first stripe pattern region and the second stripe pattern region is to be displayed.

3. The optical display body according to claim 2, wherein the visible image is visually confirmed when the stripe mask is observed from a first viewing angle range including a normal direction with respect to the stripe mask, and
   the latent image is visually confirmed when the stripe mask is observed from a second viewing angle range that is different from the first viewing angle range.

4. The optical display body according to claim 1, wherein the first stripe pattern region has a stripe pitch which is equal to a stripe pitch in the second stripe pattern region and which differs from an integral multiple of an arrangement pitch of the 2-dimensional flattened design in the second direction.

5. The optical display body according to claim 1, wherein the 2-dimensional flattened design is printed on the printed body two or more times repeatedly further in the first direction.

6. A page pair comprising a first page and a second page so as to realize the optical display body according to claim 1, wherein:
   the stripe mask is placed on the first page;
   the printed body is placed on the second page; and
   when the page pair is closed such that the first page and the second page are superimposed on each other, the stripe mask and the printed body are superimposed such that the stripe direction will be coincident with the second direction.

7. The page pair according to claim 6, wherein the page pair is formed by binding the first page and the second page together.

8. The page pair according to claim 6, wherein the stripe mask and the printed body are arranged on a same face, and
   the same face when being folded includes one side as the first page on which the stripe mask is placed, and another side as the second page on which the printed body is placed, taking a folding line as a boundary.

9. A product on which the optical display body according to claim 1 is placed.

10. A printed product, wherein the product according to claim 9 is a printed product.

11. A passport on which the optical display body according to claim 1 is placed.

12. A card on which the optical display body according to claim 1 is placed.

13. A bill on which the optical display body according to claim 1 is placed.

14. A label on which the optical display body according to claim 1 is placed.

15. A tag on which the optical display body according to claim 1 is placed.

16. A ticket on which the optical display body according to claim 1 is placed.

* * * * *